Aug. 13, 1929.  W. W. DAVIS  1,724,794
METHOD OF DETECTING ORE DEPOSITS
Filed Feb. 20, 1925
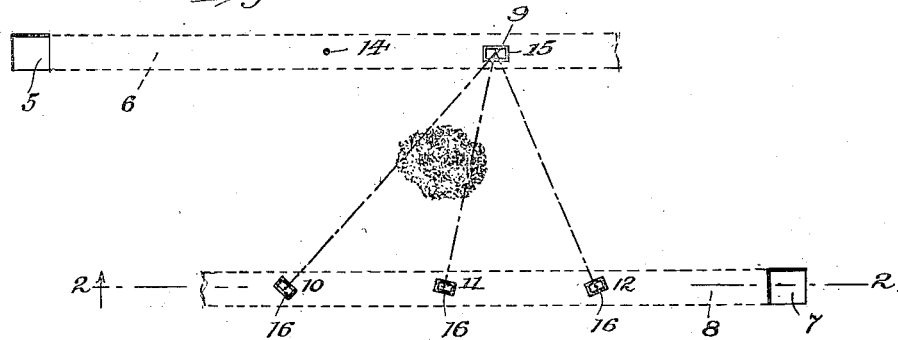
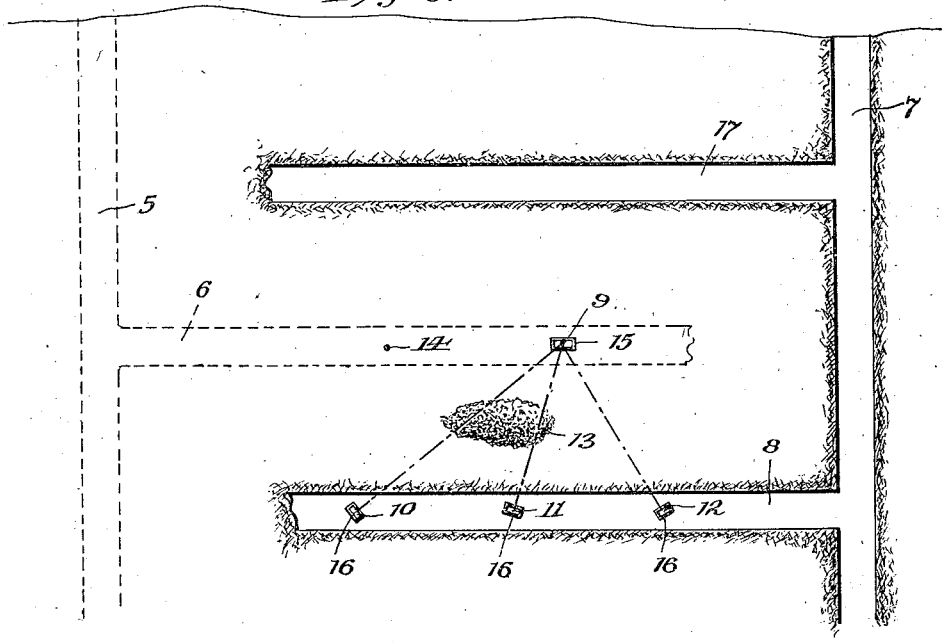
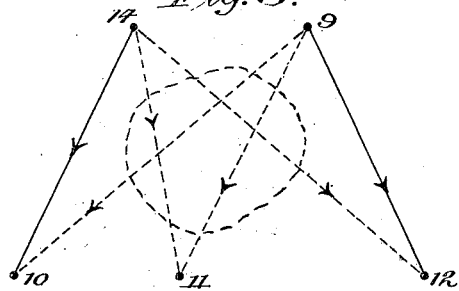
Inventor
Walter W. Davis
by Dodge & Sons,
Attorneys.

Patented Aug. 13, 1929.

1,724,794

UNITED STATES PATENT OFFICE.

WALTER W. DAVIS, OF GREAT NECK, NEW YORK.

METHOD OF DETECTING ORE DEPOSITS.

Application filed February 20, 1925. Serial No. 10,628.

This invention relates to ore detectors and particularly to an application of radiant energy, that is, Hertzian waves, to explore the earth formations surrounding subterranean workings, such as shafts, drifts, and the like.

Prior to my invention Fessenden discovered, in his experiments with his so-called "radio pelorus", that the line of approach of the wave at a receiving station did not coincide always with the line of departure from the sending station and that the deviation from the true line connecting the two stations was a function of the wave length. He ascribed the deflection to the presence in or near the normal path of the wave, of various disturbing media such as ionized air, mountain ranges, promontories, and the like, and in the case of sea-coast, the presence of wide expanses of sand beach.

It has also been discovered prior to my invention that Hertzian waves can be propagated through the earth directionally by means of loop antennæ. Not only may propagation occur in a definite direction, but the waves may be received and detected by directionally selective receiving apparatus. The main purpose which heretofore suggested the use of subterranean transmission was to avoid the deflection observed by Fessenden, and it seems never to have been recognized that such waves, when propagated through the earth, are subject to deflections similar to those which occur in the air.

I have discovered by tests that when such a wave is propagated through the earth, it proceeds without deviation so long as the structure of the earth is homogeneous, or substantially so. When, however, the structure is not homogeneous, the wave is deflected from its true course. This non-homogeneous character of the earth structure may arise from a number of conditions: there may be streams or pockets of water; there may be various different rock formations; and there may be, in the earth between the sending and receiving stations, substantial masses of metallic ore. I avail of this phenomenon, by a process of elimination, to guide me in the development of subterranean mine workings, and this method is the subject of my present application.

In practising my invention I make use of sending apparatus which I mount and operate in one drift. In another drift within the range of action of the sending device, I determine a number of stations whose position relatively to the sending station is accurately known. These drifts may lead from the same shaft or from different shafts.

The receiving apparatus is necessarily of a type capable of determining with reasonable accuracy the line of approach of the wave. The sending apparatus may or may not have a directional characteristic, but I prefer that it should have, for in this way I am able to make the best use of the relatively small amount of energy conveniently available in deep mine workings.

By comparing the determined lines of approach at the various stations in the second drift with the straight lines connecting these stations with the sending station, it is possible to ascertain whether the wave has been materially deflected in its passage between the stations. If it has not, then there is a positive indication that the structure between the two drifts is homogeneous, a fact which implies the absence of metallic ore in any paying quantity. If, however, the line of approach indicates that the waves have been deflected from their normal straight-line path between the stations, then there is a positive indication that the structure is not homogeneous and hence that ore may be present. The indication as to the presence of ore is not conclusive, but the elimination of large areas devoid of ore from further prospecting permits substantial economies. By using a number of sending stations each in combination with one or more receiving stations, a quite complete survey can be made.

This method is particularly useful in a region where well-defined fissure veins do not exist. The Leadville district in Colorado is one where such structure is common. Where fissure veins do not exist, the method is to explore by means of drifts and diamond drill holes driven therefrom. These are quite expensive operations. The exploration is done at the cost of great time and labor, much of which is not productive of any valuable result. My invention, by indicating homogeneous rock, saves the time and labor which would otherwise be devoted to drilling into such rock for the purpose of determining its character. Consequently, while the method does not positively locate ore, it does exclude from the drilling operations large areas which would otherwise be fruitlessly drilled at great expense. It thus permits the drilling operations to be confined to portions of the rock where the prospect of discovering ore is much greater.

The method may be practised in a number of specifically different ways and with various specifically different pieces of apparatus. I shall illustrate it in diagram in the accompanying drawings as applied to the exploration of an area between two drifts, and I shall indicate the sending and receiving apparatus merely by rectangular loop antennæ which are characteristic of the apparatus used by me in my tests. In the drawings, Fig. 1 is a plan view of mine workings illustrating diagrammatically the use of my invention;

Fig. 2 is a vertical section on the line 2—2 of Fig. 1; and

Fig. 3 is a plot showing how the data is used to locate areas worth testing by drilling.

5 represents the first shaft and 6 is a drift extending therefrom. 7 represents the second shaft and 8 is a drift extending therefrom. At the point 9 in the drift 6 I mount a directional sending apparatus of any suitable form indicated by the loop antenna 15. In the drift 8 I select a number of stations, three being shown and designated by the reference numerals 10, 11 and 12. The mine surveys will make it possible to determine the actual directions of each of the stations 10, 11 and 12 to the station 9. A receiving apparatus, indicated by the loop antenna 16, is set up at each of the stations 10, 11 and 12 successively, and signals are transmitted to it from the station 9.

Any suitable means may be used to determine the direction of approach, but I prefer a loop antenna mounted to be oriented and angularly elevated and its position measured in a manner similar to that used on a surveyor's transit.

Assume that there is a substantial body of ore 13 between station 9 and the drift 8, as illustrated in the drawing, the remaining formation being homogeneous. The line of approach at the stations 10 and 11 will not coincide with the line connecting these stations with the sending station 9. Since, however, the body of ore 13 is well out of the path from the station 9 to the station 12, the line of approach at the station 12 will not depart materially from the true direction. Accordingly, the operator learns that it is useless to drill in the neighborhood of the station 12 toward the station 9, or from the station 9 toward the station 12, but that between the station 9 and the stations 10 and 11 there is some irregularity of structure in the earth which may be ore.

The data secured as above may be amplified by sending from one or more additional stations 14 in drift 6 and receiving at stations in drift 8, which may be the stations 10, 11 and 12 or others, as circumstances indicate. If still further data is desired, the sending apparatus may then be operated in drift 8 at one or more stations and the receiving apparatus may be located at several stations in drift 6 or in other drifts 17, if such be available.

The effect is to produce a survey in three dimensions giving with reasonable accuracy the homogeneous areas devoid of ore, and the location and extent of non-homogeneous areas which must then be investigated by drilling, or other workings.

The plot of such a survey in plan is indicated in Fig. 3 in which the stations are numbered as in Figs. 1 and 2, and in which the solid lines indicate reception in the true direction and broken lines indicate imperically reception showing deviation, no attempt being made to illustrate such deviation. From this survey the general location of the suspected ore body can be deduced as indicated on the diagram.

I have never been able to detect any characteristic which indicates positively the presence of ore or which permits it to be located with certainty, but I am able, by a process of elimination, to exclude from expensive drilling operations large unproductive areas.

Obviously the invention may be practised with a wide variety of apparatus and the exact mode of procedure will vary somewhat with the nature of the workings and the particular problem presented. The important characteristic of the invention is the elimination from further consideration of those areas or zones which transmit the Hertzian waves without deflection, for the reason that where the waves are so transmitted, a homogeneous structure exists.

What is claimed is:

1. The step in a method of ascertaining the structure of geologic formations as to homogeneity which consists in establishing a sending and a receiving station to transmit and receive Hertzian waves through the formation being investigated, observing the direction of approach of the waves at the receiving station, and comparing it with the true direction of the sending station.

2. The method of ascertaining the structure of geologic formations as to homogeneity which consists in establishing a sending and a receiving station to transmit and receive Hertzian waves through the formation being investigated, observing the direction of approach of the waves at the receiving station, comparing it with the true direction of the sending station, repeating the above operation using different sending stations with one or more receiving stations, and finally, constructing a diagram showing the relation of non-homogeneous areas to the various stations.

3. The step in a method of ascertaining the structure of geologic formations as to homogeneity which consists in establishing a sending station and a receiving station for Hertzian waves, each having a directional characteristic, setting the sending station to direct the waves toward the receiving station, determining the actual direction of approach of such waves at the receiving station, and comparing such direction with the direction of the sending station.

4. The method of ascertaining the structure of geologic formations as to homogeneity which consists in establishing a sending station and a receiving station for Hertzian waves, each having a directional characteristic, setting the sending station to direct the waves toward the receiving station, determining the actual direction of approach of such waves at the receiving station, comparing such direction with the direction of the sending station, repeating the above operation using different sending stations with one or more receiving stations, and finally, constructing a diagram showing the relation of non-homogeneous areas to the various stations.

In testimony whereof I have signed my name to this specification.

WALTER W. DAVIS.